US009095797B2

(12) United States Patent
Girondi

(10) Patent No.: US 9,095,797 B2
(45) Date of Patent: Aug. 4, 2015

(54) FILTERING UNIT AND RELATIVE FILTERING CARTRIDGE

(75) Inventor: Giorgio Girondi, Mantova (IT)

(73) Assignee: UFI FILTERS S.P.A., Porto Mantovano (MN)

( * ) Notice: Subject to any disclaimer, the term of this patent is extended or adjusted under 35 U.S.C. 154(b) by 0 days.

(21) Appl. No.: 14/234,763

(22) PCT Filed: May 23, 2012

(86) PCT No.: PCT/IB2012/001057
§ 371 (c)(1), (2), (4) Date: Jan. 24, 2014

(87) PCT Pub. No.: WO2013/017921
PCT Pub. Date: Feb. 7, 2013

(65) Prior Publication Data

US 2014/0150388 A1 Jun. 5, 2014

(30) Foreign Application Priority Data

Jul. 29, 2011 (IT) .............................. RE2011A0059

(51) Int. Cl.

| | |
|---|---|
| ***B01D 29/13*** | (2006.01) |
| ***B01D 46/24*** | (2006.01) |
| ***B01D 46/00*** | (2006.01) |

(52) U.S. Cl.
CPC ............ *B01D 29/13* (2013.01); *B01D 46/0002* (2013.01); *B01D 46/0005* (2013.01); *B01D46/2411* (2013.01); *B01D 46/2414* (2013.01); *B01D 2201/291* (2013.01); *B01D 2201/4007* (2013.01); *B01D 2201/4084* (2013.01); *B01D 2265/028* (2013.01)

(58) Field of Classification Search
CPC ........ B01D 29/13; B01D 29/15; B01D 29/21; B01D 29/23; B01D 29/26; B01D 46/2411; B01D 46/2414; B01D 2201/291; B01D 2201/4007; B01D 2201/4084; B01D 46/0002; B01D 46/0005
USPC ..................... 55/498, 503, 504, 510; 210/454
See application file for complete search history.

(56) References Cited

U.S. PATENT DOCUMENTS 6,251,273 B1 6/2001 Jawurek et al.
8,123,937 B2 * 2/2012 Hacker ......................... 210/232

(Continued)

FOREIGN PATENT DOCUMENTS

| | | | |
|---|---|---|---|
| DE | 19707132 | A1 | 8/1998 |
| DE | 102009035033 | A1 | 2/2011 |
| WO | 02100511 | A1 | 12/2002 |

*Primary Examiner* — Robert Clemente
(74) *Attorney, Agent, or Firm* — Volpe and Koenig, P.C.

(57) ABSTRACT

A filtering unit (10) comprising a casing (20) provided with at least one inlet (32), one outlet (33) and one support body (42) provided with abutment surfaces (44) adapted to removably support a filtering cartridge (50) contained within the casing (20) and adapted to divide the internal volume of the casing (20) into two chambers (21,22) respectively connected with the inlet (32) and the outlet (33) so as to filter the fluid flowing from the inlet (32) towards the outlet (33), the filtering cartridge (50) comprising at least one coupling element (55) configured to be snap-coupled to the support body (42) following a first axial translation for mutual approaching between the filtering cartridge (50) and the support body (42), whose distinctive characteristic lies in the fact that it comprises cam means (57,58) operating between the coupling element (55) and the support body (42) so as to radially bend the coupling element (55) in a release position for disengaging the coupling element (55) from the support element (42) following a further limited mutual axial translation between the filtering cartridge (50) and the support body (42), moving in the same direction with respect to the first approaching translation, the cam means (57,58) being configured so as to keep the coupling element (55) in release position following a slight mutual rotation between the filtering cartridge (50) and the support body (42).

13 Claims, 7 Drawing Sheets

(56) References Cited

U.S. PATENT DOCUMENTS

2004/0154975 A1* 8/2004 Girondi .......................... 210/446
2007/0227963 A1* 10/2007 Fick et al. .................. 210/433.1
2007/0227964 A1* 10/2007 Fick et al. ..................... 210/450
2008/0035540 A1* 2/2008 Pflueger et al. ............... 210/133
2008/0053884 A1* 3/2008 Marshall et al. .............. 210/232
2013/0098822 A1* 4/2013 Girondi .......................... 210/236

* cited by examiner

FILTERING UNIT AND RELATIVE FILTERING CARTRIDGE

FIELD OF THE INVENTION

The present invention regards a filtering unit and the relative filtering cartridge.

Mainly the invention regards a unit for filtering lubricant oil, air or fuel in automotive applications, more in particular in applications in which there is required a high flow rate of such fluids from the filter, such as for example trucks, buses, commercial vehicles and work machines or where there is required a medium fluid flow rate, like in the motor vehicle industry.

PRIOR ART

As known the filtering of lubricant fluids in the automotive industry is generally obtained by means of a filtering unit comprising an external casing provided with an inlet for the fluid to be filtered and an outlet for the filtered fluid, and a filtering cartridge adapted to define a chamber, internal or external, communicating with the inlet of the fluid to be filtered.

Thus, the fluid flowing from the inlet towards the outlet of the filter is forced to traverse the filtering septum which withholds the impurities possibly present therein.

A typical filtering cartridge comprises a tubular-shaped filtering septum and two support plates, upper and lower, which are fixed to the opposite ends of the filtering septum.

At least one of these support plates is commonly provided with a central opening, aligned with the longitudinal axis of the filtering septum, through which the internal volume of the filtering septum is placed in communication with the inlet of the fluid to be filtered, should the filtering septum be configured to be traversed from inside outwards, or with the outlet of the fluid to be filtered, should the filtering septum be configured to be traversed from outside inwards.

The casing, in such type of filters generally comprises a support body, configured like a drinking glass, whose bottom is provided with a central hole placed in communication with the internal chamber of the filtering septum and a series of peripheral holes placed in communication with the external chamber; furthermore, the casing comprises a cover, configured for example also configured like a drinking glass, adapted to close the drinking-glass-like body.

The filtering unit, as known, is subject to periodical maintenance interventions, for example to restore the filtering capacity of the filtering cartridge or replacing it once it is clogged.

With the aim of facilitating the task of the designated personnel to remove and replace the filtering cartridge the prior art provides several solutions for removably coupling the filtering cartridge to the casing (for example to the cover or to the drinking-glass-like body), so that when the casing is opened, simultaneously the cartridge remains fixed, though removably, to the part of the casing that is removed, generally the cover.

A first type of such solutions provides for the use of a bayonet-like coupling: these types of coupling comprise at least two rigid shaped protrusions defined in the filtering cartridge, each of which is adapted to be fitted into a special substantially L-shaped groove obtained in the cover, so that the coupling is obtained by means of a slight axial translation of the filtering cartridge towards the support flange and by an ensuing slight rotation with respect to the axis of the filtering cartridge.

However, these bayonet-like couplings reveal some drawbacks mainly due to the required complexity of the coupling, especially for providing grooves in the cover.

Actually, such couplings of the bayonet-type are poorly reliable and scarcely resistant over time on one hand, especially after several replacements of the filtering cartridge and on the other hand they lead to an increase of the production costs of the filtering cartridge and the casing, as well as the costs due to the increase of the times required, in the maintenance interventions, for replacing the filtering cartridge, when for example upon the rotation imparted for opening the casing there corresponds an inadvertent decoupling of the bayonet coupling systems.

A second known type of couplings, alternative with respect to the aforementioned bayonet-like couplings, provides for the use of axial-snap-couplings, which however, though particularly efficient at stably coupling the filtering cartridge to the cover, are not easy to decouple in an equally quick and easy manner, requiring considerable effort from the personnel and/or the use of tools that could ruin the mechanical parts of the coupling which should be reutilised, as well as repeatedly requiring handling and manoeuvring the dirty filtering septum.

This is due to the fact that the need for guaranteeing the coupling of the filtering cartridge necessarily requires providing an axial-snap-coupling that is hard to remove.

An object of the present invention is to overcome the aforementioned drawbacks of the prior art through a simple, rational and inexpensive solution.

Such objects are attained by the characteristics of the invention indicated in the independent claims. The dependent claims outline preferred and/or particularly advantageous aspects of the invention.

DESCRIPTION OF THE INVENTION

In particular, the invention provides a filtering unit comprising a casing provided with at least one inlet, one outlet and one support body provided with abutment surfaces adapted to removably support a filtering cartridge contained within the casing and adapted to divide the internal volume of the casing into two chambers respectively connected with the inlet and the outlet so as to filter the fluid flowing from the inlet towards the outlet, the filtering cartridge comprising at least one coupling element configured to be snap-coupled to the support body following a first axial translation for mutual approaching between the filtering cartridge and the support body.

According to the invention, the filtering unit comprises cam means operating between the coupling element and the support body so as to radially bend the coupling element in a release position for disengaging the coupling element from the support element following a further limited mutual axial translation between the filtering cartridge and the support body, moving in the same direction with respect to the first approaching translation; furthermore, the cam means are configured so as to keep the coupling element in release position following a slight mutual rotation between the filtering cartridge and the support body.

This solution allows facilitating the operations for decoupling and coupling the filtering cartridge from the support body, hence sufficiently rigid, though elastically yieldable, and resistant coupling elements adapted to support filtering cartridges of considerable weight and highly stressed during operation can be used.

Furthermore, due to this solution, the filtering unit is safe to use, relatively inexpensive and simple to make with respect to the bayonet-like coupling systems, commonly used in the industry and, in addition, the installation of the filtering cartridge is considerably simple and quick.

A further object of the invention also provides a filtering cartridge comprising a toroidal filtering septum and at least one support plate fixed to an end of the filtering septum, the support plate comprises a coupling element adapted to be snap-coupled in a casing of a filtering unit, in which the coupling element comprises at least two teeth made of an elastically yieldable material which are derived from the upper support plate, each of which defines a coupling surface faced towards the supporting plate and which is inclined with respect to the direction of longitudinal development of the tooth by an angle comprised between 0° and 90°.

Advantageously, each of the teeth comprises: an opposite surface, with respect to the coupling surface, defining the top part of the tooth which is inclined with respect to the coupling surface by an acute angle, and a substantially sharp-pointed lateral border, whose end is substantially planar or rounded.

In practice, said opposite surface of the tooth is inclined by an acute angle with respect to the support plate.

According to a preferred aspect of the invention, the side of each tooth from which the support surface is derived cantilevered is aligned—in plan view—with a portion of said opposite surface.

In practice, the opposite surface which is placed above the couplings surface, extends therebeyond (in the direction opposite to the vertex) by a positive and non-zero distance.

A further aspect of the invention provides for that the opposite surface and the lateral border define cam means adapted to bend the tooth in radial direction following a thrust thereof in the axial direction against a stop surface.

Furthermore, each tooth is adapted to be snap-coupled in at least one recess provided in a support body which is derived inside the casing of a filtering group, such recess comprises a substantially flat abutment surface, adapted to define a plane for supporting the coupling surface of the tooth, and a surface (the aforementioned stop surface), opposite to the abutment surface; each tooth particularly has a height, calculated between the coupling surface and the base of the tooth, which is greater with respect to the distance between the opposite surface of the support body and the free end thereof.

Advantageously the distance between the coupling surface of the tooth and the top part thereof is smaller than the distance between the opposite surface of the support body and the base thereof.

BRIEF DESCRIPTION OF THE DRAWINGS

Further characteristics and advantages of the invention will be apparent from reading the following description provided by way of non-limiting example, with reference to the figures illustrated in the attached drawings.

PREFERRED EMBODIMENT OF THE INVENTION

Figure 1:
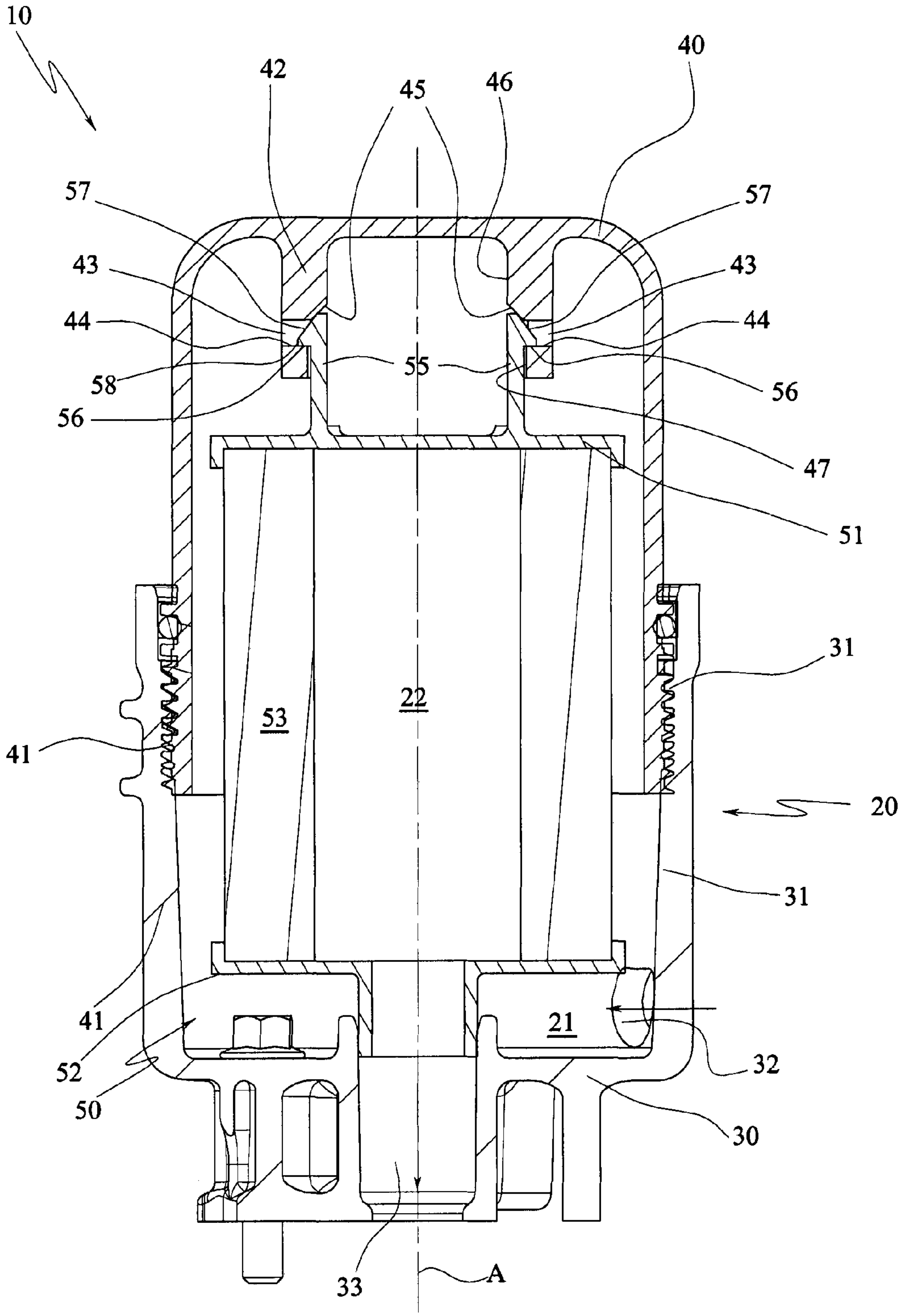
FIG. 1 is a longitudinal sectional view of a filtering unit, according to the invention.

With particular reference to such figures, a filtering unit, for example a lubricant oil, air or fuel filter, intended to be applied to internal combustion engines, in particular Diesel engines for motor vehicles, trucks, commercial vehicles or self-propelled work machines is indicated in its entirety with 10. The filtering unit 10 comprises an external casing, indicated in its entirety with 20, which is defined by a lower body 30 configured like a drinking glass, provided with an internally threaded portion 31 and by an upper cover 40, also configured like a drinking glass and adapted to close the drinking-glass-like body 30, by means of an external threaded portion 41 and by interposing—between the cover and the drinking-glass-like body 30—a sealing gasket inserted in a special annular seat obtained in the cover 40 and intended to be comprised between the cover and the drinking-glass-like body, so as to guarantee the hermetic sealing of the external casing 20 of the filtering unit 10.

The drinking-glass-like body 30, for example, comprises an inlet conduit 32 for the fluid (fuel, lubricant oil or air) to be filtered and an outlet conduit 33 for the filtered fluid.

Within the casing 20 there is further received a filtering cartridge, indicated in its entirety with 50, comprising an upper support plate 51 and a lower support plate 52, which are fixed to the opposite ends of a tubular-shaped filtering septum 53, a pleated septum in this case, but it can also be of the depth polymeric septum type, which defines and delimits a volume within the substantially cylindrical filtering cartridge 50.

The lower support plate 52 has a central hole aligned and centred on the longitudinal axis A of the filtering septum 53.

The lower support plate 52 further comprises a hollow shank 54 which is inserted—for example by inserting a sealing ring—not shown—for example directly into the outlet conduit 33 of the drinking-glass-like body 30 further contributing to the centring of the filtering cartridge 50 within the casing 20 and to the stability thereof upon assembling the filtering unit.

Due to the previously described configuration, the filtering cartridge 50 divides the internal volume of the casing 20 into a first chamber 21, defined outside the filtering septum 53, which communicates with the inlet conduit 32 for the fuel to be filtered and into a second chamber 22, coinciding with the internal volume of the filtering septum 53, communicating with the outlet conduit 33 for the filtered fuel.

At the upper surface of the upper support plate 51 of the filtering septum 53, which is closed solely by way of example, so as to close the axial end of the filtering septum 53 and, thus, of the second chamber 22, there is obtained a coupling element defining a coupling surface 56, for example, substantially planar or concave and resting (in the represented examples) on a plane substantially orthogonal with respect to the longitudinal axis A of the filtering septum 53 (vertical direction in the figure).

The coupling element is adapted to be snap-coupled, following a radial deformation thereof, to a support body, intended to support the filtering cartridge 50 within the casing 20, following a first translation of mutual approaching between the filtering cartridge 50 and the support body along the longitudinal axis A.

Particularly, the filtering cartridge 50 comprises cam means which are configured so as to operate between the coupling element and the support body so as to radially bend the coupling element in a release position, in which the coupling surface 56 is free to slide in the axial direction, for disengaging the coupling element from the support element.

In practice the disengagement of the coupling element occurs following a further limited mutual translation between the filtering cartridge 50 and the casing 20 along the longitudinal axis A, such limited mutual translation occurring in the same direction with respect to the first approaching translation.

Furthermore, the cam means are configured so as to maintain the coupling element in the release position due to a slight mutual rotation between the filtering cartridge 50 and the support body with respect to the axis A, following the further limited approaching translation mentioned above.

The coupling element comprises at least two teeth 55 which are derived from the upper surface of the upper support plate 51, for example diametrically opposite to each other and symmetric with respect to the longitudinal axis A, and which are obtained using an elastically yieldable material.

Each tooth 55 has a section—in plan view—substantially circle-arc-shaped and they are aligned substantially along an imaginary circumference.

Figures 2, 3:
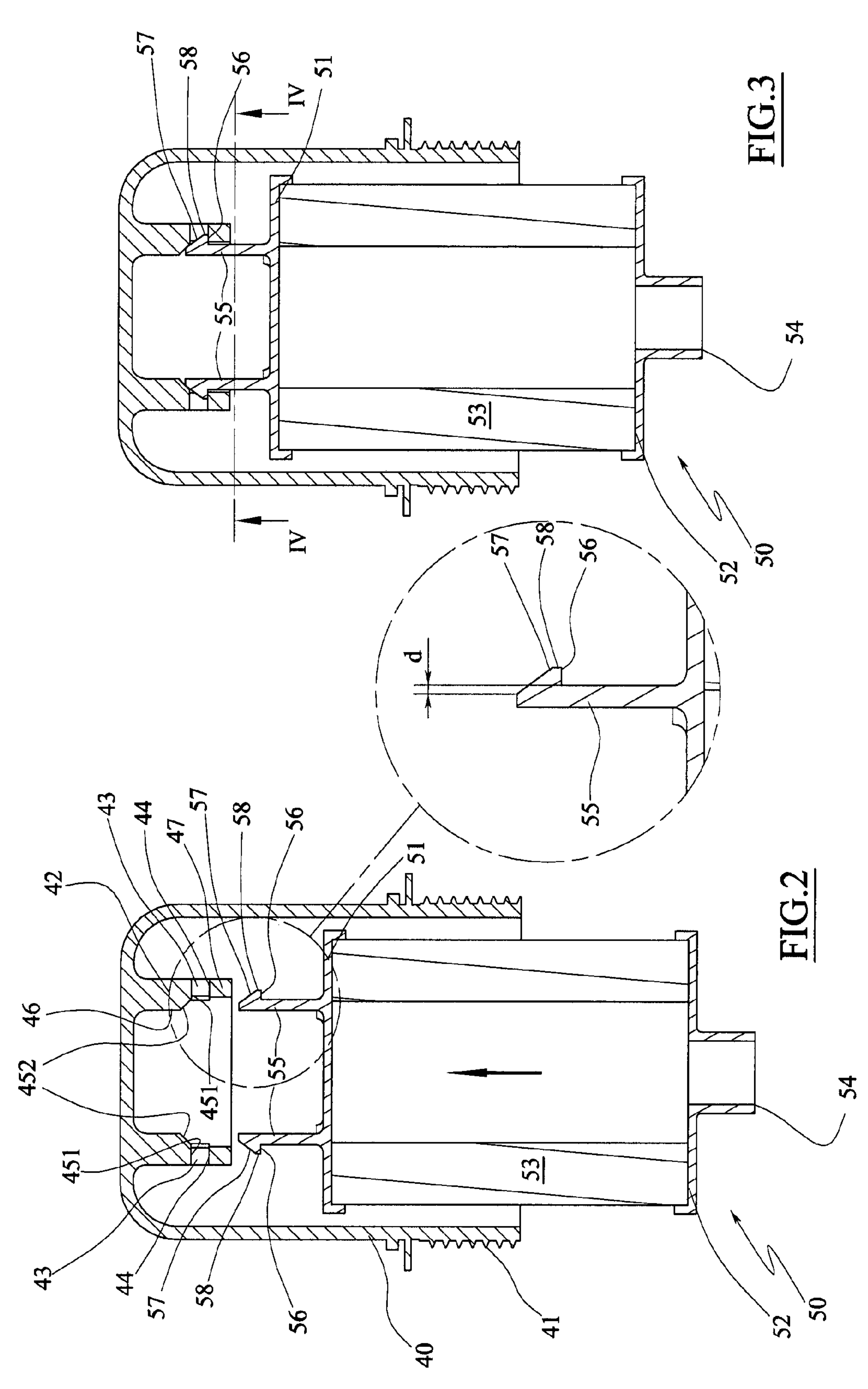
FIG. 2 is a longitudinal sectional view of a filtering cartridge in a first position before coupling to the support body obtained in the cover of the casing, according to a first embodiment of the filtering unit, and the relative enlarged detail.
FIG. 3 is a view of FIG. 2 with the filtering cartridge in coupled position.
Figures 10, 11:
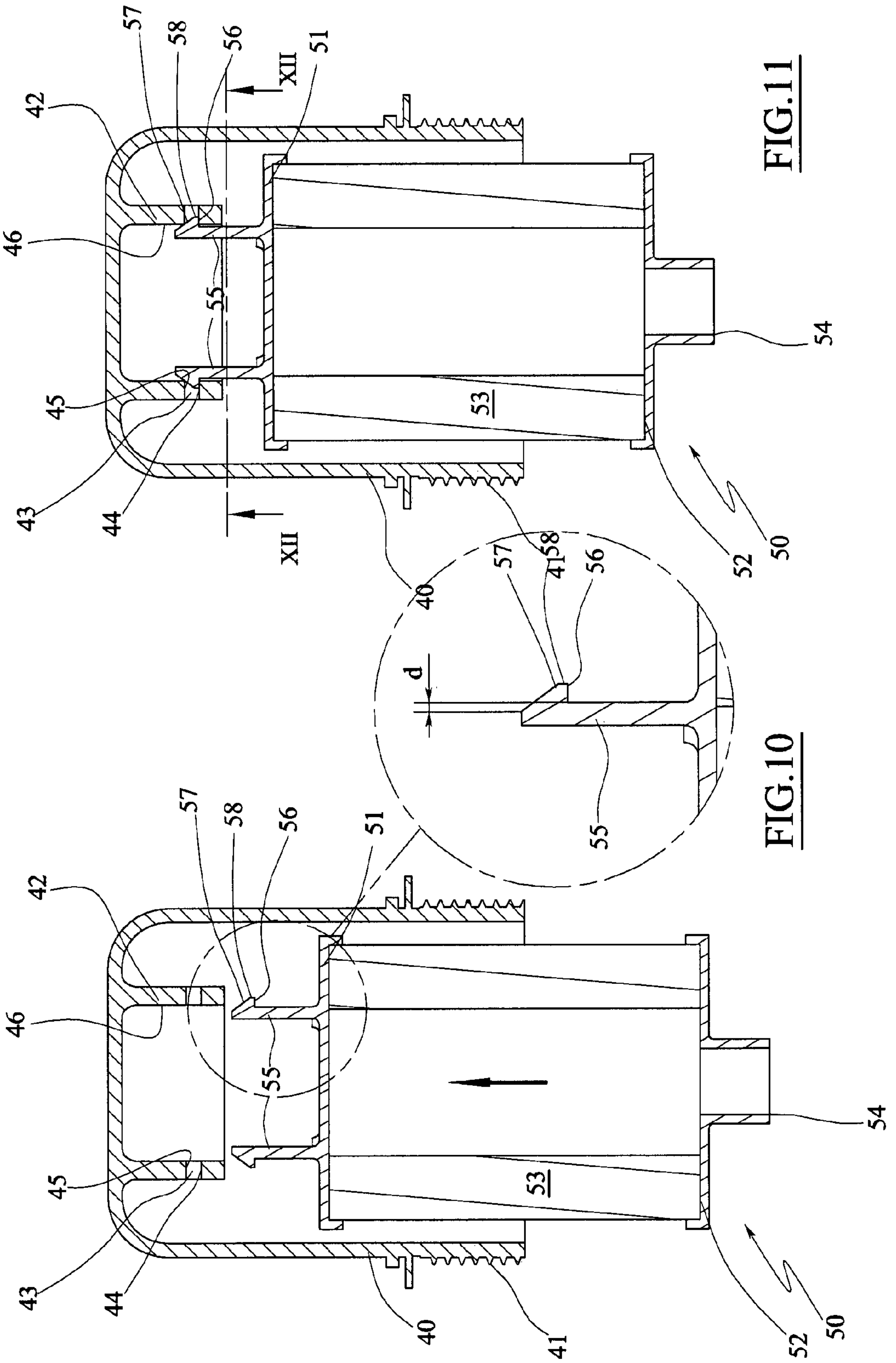
FIG. 10 is a longitudinal sectional view of the filtering cartridge in a first position before coupling to the cover, according to a second embodiment of the filtering unit, and the relative enlarged detail.
FIG. 11 is a view of FIG. 10 with the filtering cartridge in a coupled position.
Figure 18:
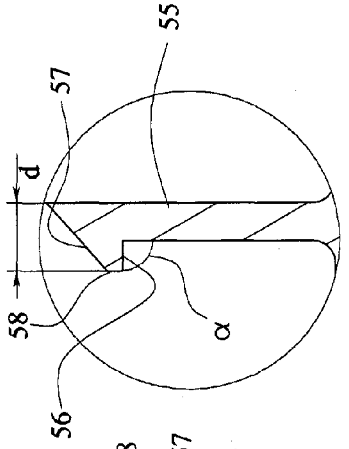
FIG. 18 is a view of a detail regarding the coupling element of FIG. 17.
Figure 16:
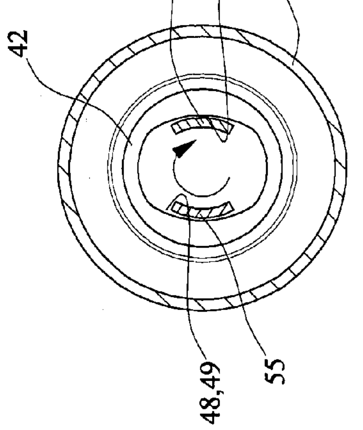
FIG. 16 is the view along the line of section XVI-XVI of FIG. 15.

Each tooth 55 defines one of said coupling surfaces 56, for example substantially flat or concave, which are derived cantilevered from each tooth and are faced towards the upper support plate 51 and inclined with respect to the direction of longitudinal development of the tooth 55 by an angle $\alpha$ comprised between 0° and 90° (see the details of FIGS. 2, 10 and 18).

In the example, the coupling surface 56 is inclined by 90° with respect to the direction of longitudinal development of the tooth 55, i.e. the coupling surface 56 is substantially parallel to the upper support plate 51; however it cannot be excluded that it can be inclined for example by 30°, 45°, 60° or the like depending on the rigidity of the tooth 55 or the anchoring force required for the single application (for example as a function of the maximum weight of the filtering septum or other construction parameters).

The inclination angle $\alpha$ of the coupling surface 56 is, thus, always such to confer the ideal anchoring force of the filtering cartridge 50 to the support body of the casing 20.

Actually it is often concretely observed that the sealing ring, which is interposed between the hollow shank 54 and the outlet conduit 33, is subject to deterioration (for example due to the temperature or chemical action exerted by the fluid to be filtered), hence producing the inadvertent bonding between the hollow shank 54 and the outlet conduit. When the cover 40 is opened, the adhesion of the filtering cartridge 50 to the drinking-glass-like body 30 (in the illustrated case) causes the inadvertent decoupling of the coupling element from the support body of the casing 20.

The inclination of the coupling surface 56, as described above, is such to guarantee that, upon opening the casing 20, the filtering cartridge 50 remains coupled to the support body of the casing 20, whether it is placed at the drinking-glass-like body 30 or at the cover 40 (as illustrated). Furthermore, a greater number of teeth 55 can be provided.

Each tooth 55 comprises an opposite surface 57 with respect to the coupling surface 56, which defines the top part of the tooth (which, as observable in the figures is substantially flat and involves the entire upper surface of the tooth 55, as observable in FIG. 18 or part thereof, as observable in the enlarged details of FIG. 2 and FIG. 10 continuously, without notches) and it is inclined with respect to the coupling surface 56 substantially by an acute angle.

In practice, the opposite surface 57 defines an upper edge of the tooth 55, which is for example defined by the joining line between a wall substantially parallel to the upper top part support plate 51 of the tooth 55 and such opposite surface 57 (FIG. 2 and FIG. 10) or from the joining line between one side of the tooth 55 (the side opposite the side in which the coupling surface 56 is provided, the internal one in the figures) and the opposite surface 57 (FIG. 18).

The upper edge of the tooth 55, thus defined, has a distance from the longitudinal axis A smaller (and never equivalent or greater) than the distance of the edge between the side of the tooth 55 (external one in the figures) and the support surface 56.

Obviously, should the support surface 56 be arranged facing the interior of the tooth 55 the ratio between the distances would follow the reverse relation. In practice, the side of the tooth 55 from which the support surface 56 (i.e. the edge interposed therebetween) is derived cantilevered, is always aligned—in plan view—with a portion of said opposite surface 57.

Each tooth 55 also comprises a substantially sharp-pointed lateral border 58 which can also be round-pointed or bevelled according to requirements, from which the coupling surface 56 and the opposite surface 57 depart.

Particularly, the cam means are defined by the opposite surface 57 and by the lateral border 58 of each tooth 55 and they cooperate with the support body of the casing 20, as better observable hereinafter, for decoupling the filtering cartridge 50 from the support body.

In other words, the opposite surface 57 which is arranged above the coupling surface 56, extends—in plan view—therebeyond (in the direction opposite to the vertex defined by the lateral border 58) by a non-zero distance (positive), indicated with letter d in FIGS. 2, 10 and 18.

Such distance d is substantially greater (strictly) than zero and smaller/equivalent to the thickness of the tooth 55 (for example intended as the distance between the internal side and the external side thereof).

Due to the aforementioned configuration of the opposite surface 57 it is possible to configure the filtering cartridge 50, so as to be easily decoupled from the support body of the casing 20, in practice allowing it to serve, without ever jamming, as a cam for gradually bending the teeth 55 in the direction opposite to the lateral border 58.

The support body, associated to the casing to support the filtering cartridge 50, comprises a sleeve 42 longitudinally projecting from an interior surface of the cover 40 facing, in use, the filtering cartridge 50 and deriving threfrom.

The sleeve 42 is provided with at least two recesses 43 perimetrally closed and obtained in the lateral wall of the hollow shank. Each recess 43 comprises an abutment surface 44 substantially flat, adapted to define a plane for supporting the coupling surface 56 of the tooth 55, and a sliding surface 45, opposite to the abutment surface 44 and adapted to come to contact with the cam means of the filtering cartridge 50, in particular with the opposite surface 57 of the tooth 55, for disengaging the teeth from the sleeve 42, following the mutual sliding of the two surfaces (sliding surface 45 and opposite surface 57).

The sliding surface 45 of the recesses 43 is positioned at a given distance from the base of the sleeve 42 defined by the interior surface of the cover 40 from which the hollow shank is derived.

Between the base and the sliding surface 45 of the recesses 43 the sleeve 42 comprises an annular band 46 adapted to supportingly receive the lateral border 58 of the teeth 55, when they are in the release position thereof and the filtering cartridge 50 is pressed, for example to the maximum travel thereof, against the cover 40.

The annular band 46, in this case, corresponds to the internal jacket of the sleeve 42 in the area extending from the base thereof up to the area involved by the recesses 43; actually, the teeth 55, in the represented example, are adapted to be axially inserted into the hollow shank, with the lateral borders 58 adapted to slide within the hollow shank until they are snap-fitted into the recesses 43, with the coupling surface 56 resting on the abutment surface 44 which axially constrains the filtering cartridge 50 with respect to the cover 40.

The sleeve 42 also comprises a further annular band 47 which extends from the free end of the hollow shank up to the abutment surface 44 of the recesses 43.

Between the annular bands 46 and 47, the sleeve 42 comprises extended appendages 48 which axially join—bridge-like—the annular band 46 to the further annular band 47 and develop in the circumferential direction between one recess 43 and the other.

In practice, the annular band 46 and the extended appendages 48 (and possibly the further annular band 47) define a single surface, substantially uninterrupted, (within the sleeve 42 in this case) which borders the recesses 43.

The lateral border 58 of each tooth 55, when the latter is not coupled in one of the recesses 43, is adapted to slide along the annular band 46—if actuated in rotation, following the axial translation which allows the exit thereof from the recess 43—and along the extended appendages 48—if actuated in axial translation—, still maintaining the teeth 55 in release position (i.e. bent inwards), for decoupling the filtering cartridge 50 from the sleeve 42.

In this case, each tooth has a useful height, for example calculated between the coupling surface 56 and the base of the tooth (i.e. the upper surface of the upper support plate 51), which should be greater with respect to the distance between the sliding surface 45 of the recess 43 and the free end of the hollow shank, so as to allow the tooth 55 coupled in the recess 43 an extra-travel approaching the bottom of the sleeve 42 which allows the bending thereof inwards and decoupling thereof from the recess.

Concretely, when the upper support plate 51 is at the end stop, abutting against the free end of the sleeve 42, the lateral border 58 of each tooth is substantially the only part of the tooth that is at contact with the hollow shank, in particular, with the annular band 46 thereof.

FIGS. 2 to 9 show a first embodiment of the filtering unit, according to the invention, in which the sliding surface 45 of each recess 43 has a first peripheral section 451 substantially orthogonal to the longitudinal axis A and a second section 452, concentric to the first section 451 and arranged therein, inclined by an acute angle, with respect to the lying plane of the first section, which defines a projecting plane adapted to gradually bend the tooth 55 when the opposite surface 57 thereof is pressed against the sliding surface.

The annular band 46, in such embodiment, is cylindrical shaped with a substantially cylindrical section, in which the internal diameter of the annular band 46 is smaller than the internal diameter of the further annular band 47 (which has an internal diameter substantially equivalent to the diameter of the first section 451) alone.

This first embodiment of the invention operates as follows.

Coupling the filtering cartridge 50 to the cover 40, and thus to the sleeve 42, simply requires inserting the teeth 55 into the sleeve 42 in the special grooves, so that they are snap-fitted into the recesses 43 following an axial translation and the coupling surfaces 56 stably rest on the respective abutment surface 44 (see FIGS. 2 and 3).

Figure 5:
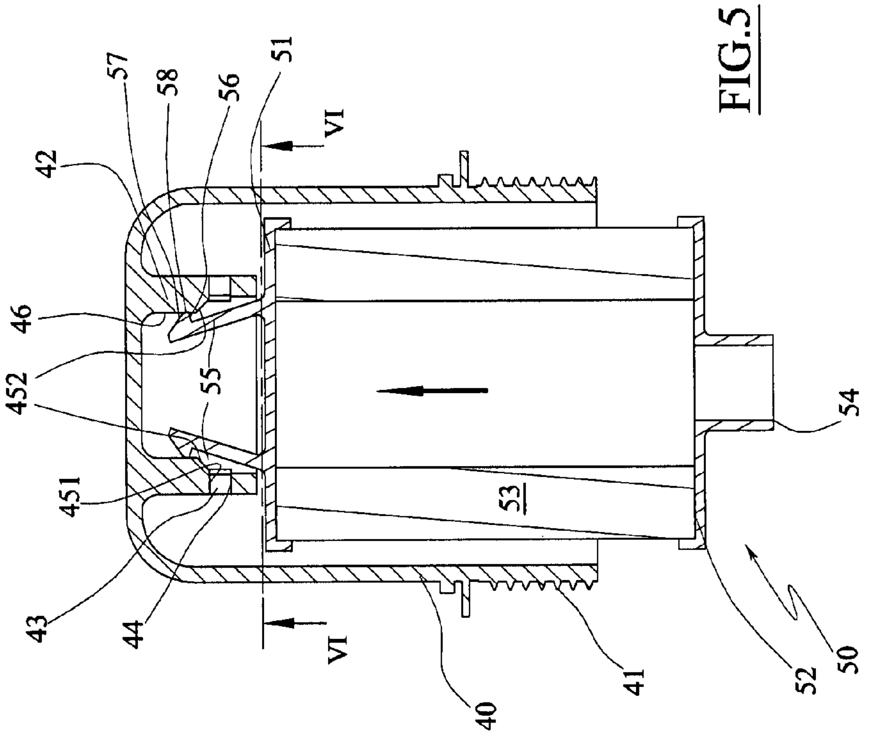
FIG. 5 is a longitudinal sectional view of the filtering cartridge of FIG. 2 in a first decoupling position.
Figure 4:
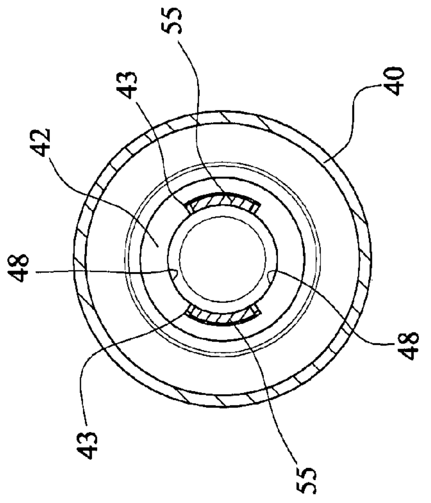
FIG. 4 is the view along the line of section IV-IV of FIG. 3.
Figure 6:
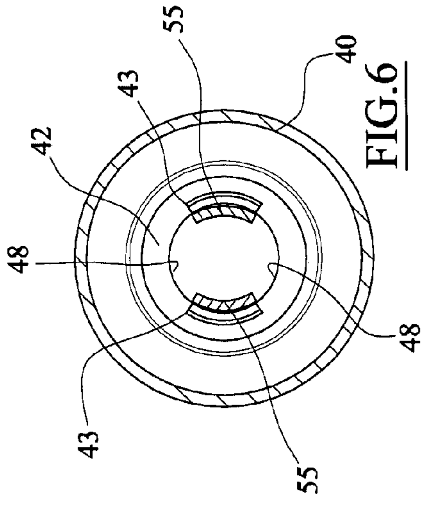
FIG. 6 is the view along the line of section VI-VI of FIG. 5.

Decoupling the filtering cartridge 50 simply requires translating mutually approaching the filtering cartridge and the cover 40 (in the same direction performed for the coupling); thus the teeth 55, i.e. the opposite surface 57 thereof, comes to contact with the second section 452 of the sliding surface 45 (aligned—in plan view—with the opposite surface 57 of the tooth 55), as observable in FIG. 3 (furthermore, it can also be provided for that the opposite surface 57 and the second section 452 be already at contact when the tooth 55 is in the coupling position); in addition, by continuing pressing the filtering cartridge 50 towards the base of the sleeve 42, the opposite surface 57 of the tooth slides on the second section 452 of the sliding surface 45 simultaneously bending the tooth 55 inwards, until the lateral border 58 of each tooth 55, having entirely traversed the second section 452, rests on the annular band 46 (as observable in FIG. 5).

Due to the fact that the external side of each tooth 55 from which the support surface 56 is derived cantilevered is aligned—in plan view—with a portion of said opposite surface 57, the support surface is the only part of the tooth 55 that comes to contact, following the axial translation, with the sliding surface 45 allowing limiting, if not even eliminating, the risk of the tooth 55 jamming to the minimum and thus guaranteeing the radial flexion of the tooth 55 which allows the decoupling thereof.

Figure 9:
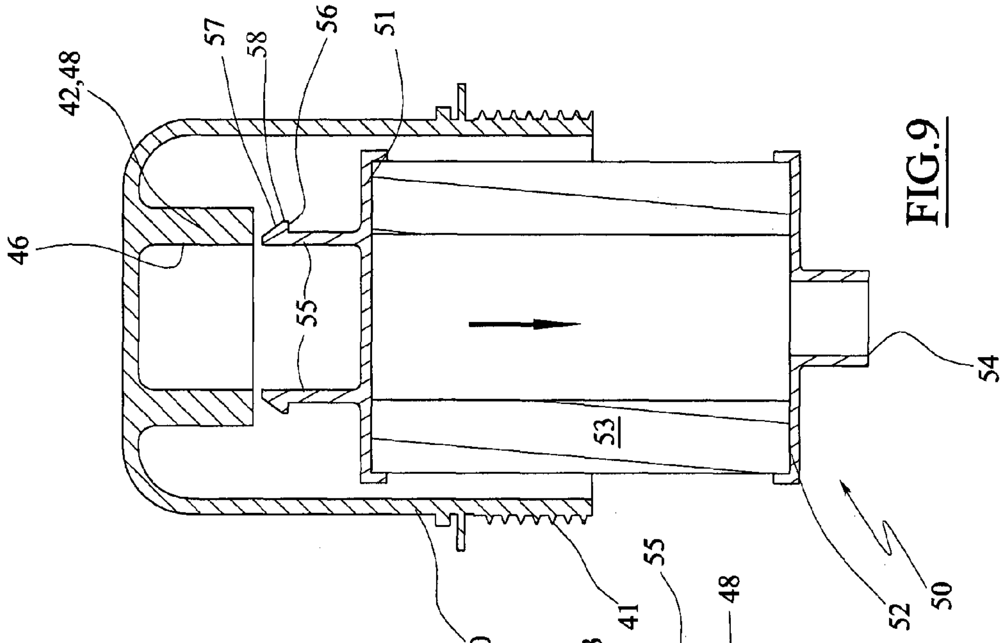
FIG. 9 is a longitudinal sectional view of the filtering cartridge of FIG. 2 in a decoupled configuration.
Figure 8:
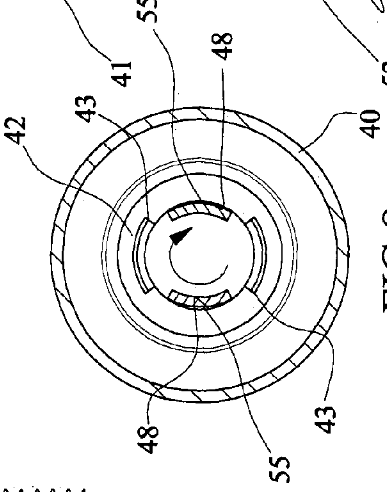
FIG. 8 is the view along the line of section VIII-VIII of FIG. 7.
Figure 7:
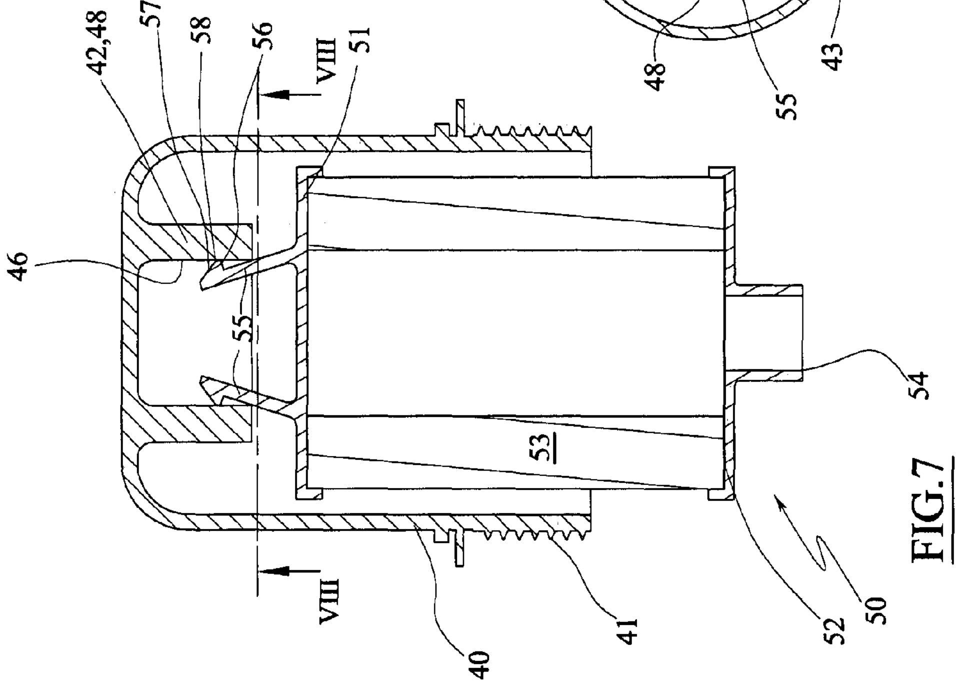
FIG. 7 is a longitudinal sectional view of the filtering cartridge of FIG. 2 in a second decoupling position.

When the teeth 55 are in such position, axial end stop, it is sufficient to rotate (indistinctively in one or the other direction) by a limited angle, by 90° in the represented example, the filtering cartridge, so that the lateral border 58, pressed against the annular band 46 by the elasticity of the tooth, can slide on the annular band 46 until it is aligned—in plan view—with one of the extended appendages 48, as observable in FIGS. 7-9.

From the latter position the teeth 55 are free to axially slide moving away from the cover 40, as observable in FIG. 9, to remove the filtering cartridge 50 from the coupling with the sleeve 42.

FIGS. 10 to 17 show a second embodiment of the filtering unit, according to the invention, in which the sliding surface 45 of each recess 43 is substantially flat and it is arranged substantially orthogonal to the longitudinal axis A.

The annular band 46, in such embodiment, is cylindrical-shaped with circular outer section and substantially elliptic inner section, such to define areas of the hollow shank with greater thickness aligned—in plan view—with the extended appendages 48 and areas with smaller thickness aligned—in plan view—with the recesses 43.

In practice, the annular band 46 has radial cambers 49 aligned—in plan view—with the extended appendages 48 (also analogously cambered to have a continuous surface developing over the entire hollow shank at the extended appendages) which are such to bend the teeth 55, in the radial direction, further with respect to the flexure imparted by the opposite surface 57 during the axial decoupling translation, when they are aligned—in plan view—with the extended appendages 48.

This second embodiment of the invention operates as follows.

Coupling the filtering cartridge 50 to cover 40, and thus to the sleeve 42, simply requires fitting the teeth 55 into the sleeve 42 in the special grooves, so that they are snap-fitted in the recess 43 following an axial translation and the coupling surfaces 56 stably rest on the respective abutment surface 44, in a manner entirely analogous to that observed regarding the first embodiment.

Figure 13:
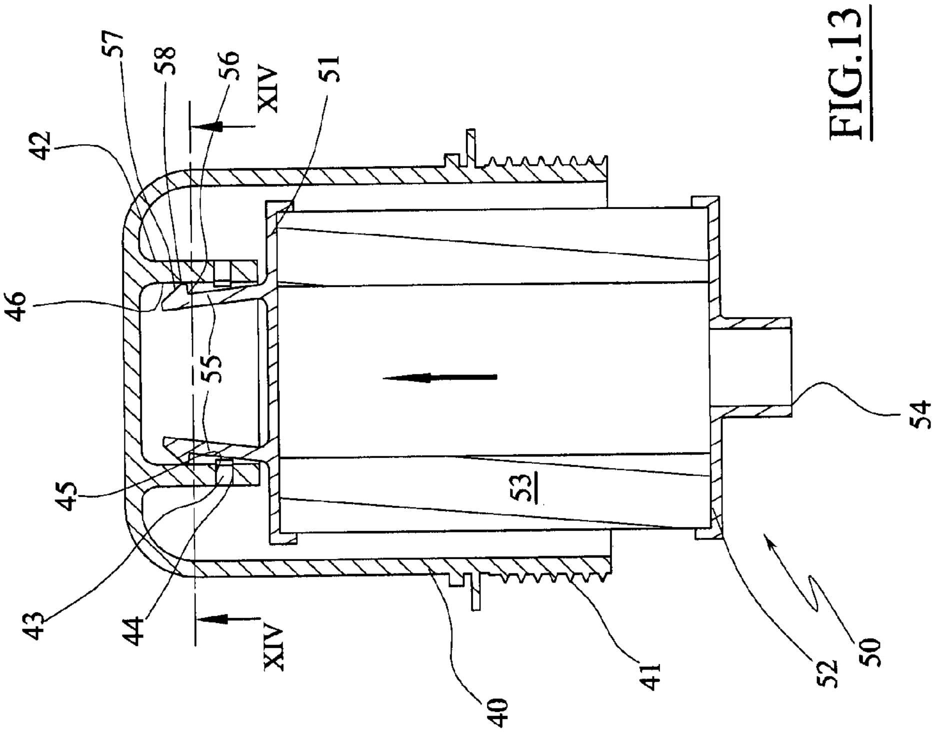
FIG. 13 is a longitudinal sectional view of the filtering cartridge of FIG. 10 in a first de coupling position.
Figure 12:
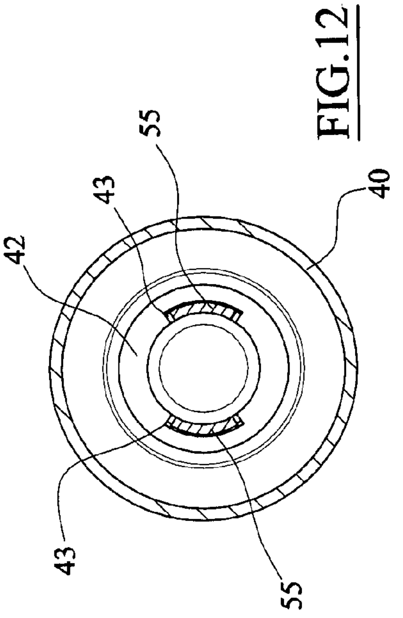
FIG. 12 is the view along the line of section XII-XII of FIG. 11.
Figure 14:
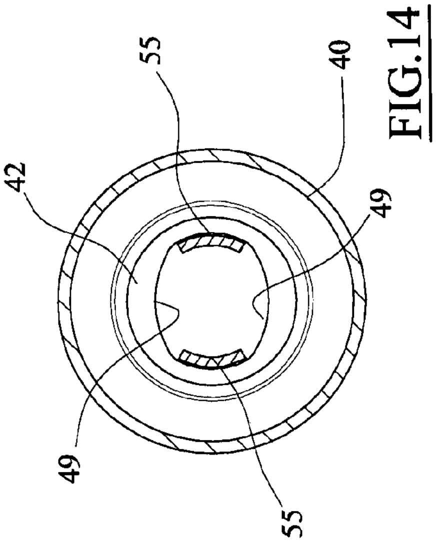
FIG. 14 is the view along the line of section XIV-XIV of FIG. 13.

Decoupling the filtering cartridge 50 simply requires translating mutually approaching the filtering cartridge and the cover 40, in the same direction performed for coupling; thus, the teeth 55, i.e. the opposite surface 57 thereof, is at contact with the sliding surface 45 (in practice the inner edge thereof which is aligned—in plan view—with the opposite surface 57 of the tooth 55), as observable in FIG. 11 (it can be alternatively provided for that the opposite surface 57 and the sliding surface 45 be already at contact when the tooth 55 is in the coupling position); by continuing pressing the filtering cartridge 50 towards the base of the sleeve 42, the opposite surface 57 of the tooth 55 slides on the sliding surface 45 (the edge thereof) and the tooth 55 slightly bends inwards, until the lateral border 58 of each tooth 55, having entirely traversed the sliding surface 45, surmounts the edge of the sliding surface and rests on the annular band 46 (as observable in FIG. 13).

Due to the fact that the external side of each tooth 55 from which the support surface 56 is derived cantilevered is aligned—in plan view—with a portion of said opposite surface 57, the very opposite surface is the only part of the tooth 55 that comes to contact, following the axial translation, with the sliding surface 45 which allows limiting, if not even eliminating, the risk of the tooth 55 jamming to the minimum and thus guaranteeing the radial flexion of the tooth 55 which allows the decoupling thereof.

When the teeth 55 are in such position, axial end stop, it is sufficient to rotate the filtering cartridge 50 by a limited angle, by 90° in the represented example (FIGS. 14 and 16), so that the lateral border 58, pressed against the annular band 46 by the elasticity of the tooth, can slide on the annular band 46 until it is aligned—in plan view—with one of the extended appendages 48 (as observable in FIGS. 16 and 17) traversing the cambers 49 in the circumferential direction and thus continuing constantly bending radially inwards.

Figure 17:
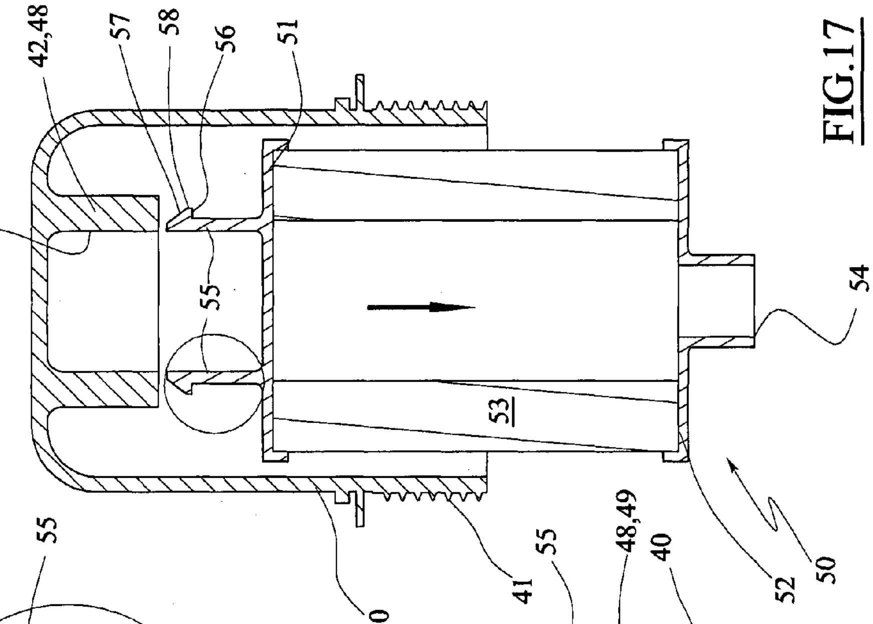
FIG. 17 is a longitudinal sectional view of the filtering cartridge of FIG. 10 in a decoupled configuration.
Figure 15:
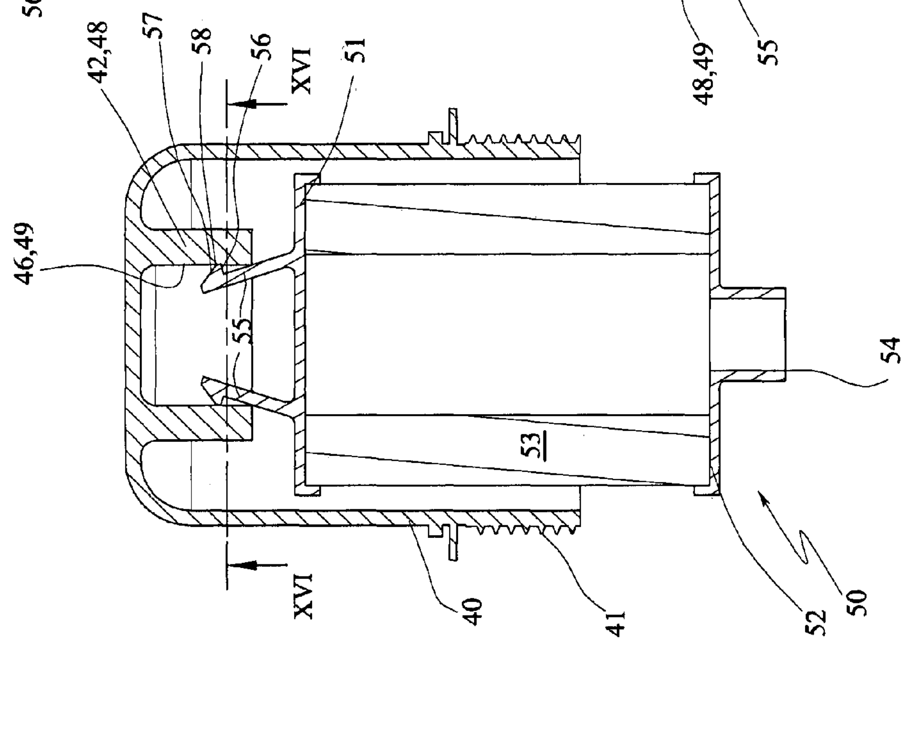
FIG. 15 is a longitudinal sectional view of the filtering cartridge of FIG. 10 in a second decoupling position.

From the latter position, in which the teeth 55 are for example at the top part of the cambers 49 and aligned—in plan view—with the extended appendages 48, the teeth are free to axially slide moving away from the cover 40, as observable in FIGS. 15 and 17, traversing the axial back of the camber 49 up to the free end of the sleeve 42, to remove the filtering cartridge 50 from the coupling with the hollow shank.

The invention thus conceived can be subjected to numerous modifications and variants all falling within the inventive concept, for example the hollow shank can alternatively be obtained at the bottom of the drinking-glass-like body; in addition the hollow shank can be alternatively configured to be fitted within the area (circular) defined by the teeth, or other technically equivalent variant.

Furthermore, all details can be replaced by other technically equivalent elements.

In practice the materials used, as well as contingent shapes and dimensions, may vary depending on the requirements without departing from the scope of protection of the claims that follow.

The invention claimed is:

1. Filtering unit (10) comprising a casing (20) provided with at least one inlet (32), one outlet (33) and one support body (42) provided with abutment surfaces (44) adapted to removably support a filtering cartridge (50) contained within the casing (20) and adapted to divide the internal volume of the casing (20) into two chambers (21,22) respectively connected with the inlet (32) and the outlet (33) so as to filter the fluid flowing from the inlet (32) towards the outlet (33), the filtering cartridge (50) comprising at least one coupling element (55) configured to be snap-coupled to the support body (42) following a first axial translation for mutual approaching between the filtering cartridge (50) and the support body (42), the filtering unit (10) comprising cam means (57,58) operating between the coupling element (55) and the support body (42) so as to radially bend the coupling element (55) in a release position for disengaging the coupling element (55) from the support body (42) following a further limited mutual axial translation between the filtering cartridge (50) and the support body (42), moving in the same direction with respect to the first approaching translation, the cam means (57,58) being configured so as to keep the coupling element (55) in a release position following a slight mutual rotation between the filtering cartridge (50) and the support body (42).

2. Unit (10) according to claim 1, wherein the filtering cartridge (50) comprises a toroidal filtering septum (53), an upper support plate (51) and a lower support plate (52) fixed to the opposite ends of the filtering septum (53), the coupling element comprising at least two teeth (55), obtained using an elastically yieldable material, which are derived from the upper support plate (51), each tooth (55) defining a coupling surface (56) substantially flat facing towards the upper support plate.

3. Unit (10) according to claim 2, wherein each of the teeth (55) comprises: a surface (57) opposite with respect to the coupling surface (56) defining the top part of the tooth (55) and inclined with respect to the coupling surface by an acute angle, and a substantially sharp-pointed lateral border (58).

4. Unit (10) according to claim 1, wherein the support body comprises a sleeve (42) longitudinally projecting from an interior surface of the casing (20) facing, in use, the filtering cartridge (50) and provided with at least two recesses (43) perimetrally closed and obtained in the lateral wall of the sleeve (42), each recess (43) defining a substantially flat abutment surface (44), adapted to define a plane for supporting the coupling surface (56) of the tooth (55), and a sliding surface (45,451,452), opposite to the abutment surface (44) and adapted to come to contact at least with the opposite surface (57) of the filtering cartridge (50) for disengaging the coupling element (55) from the support body (42), said sliding surface (45,451,452) and said opposite surface (57) defining said cam means.

5. Unit (10) according to claim 4, wherein the sleeve (42) comprises an annular band (46) interposed between the interior surface of the casing (20) and the recesses (43) and adapted to supportingly receive the lateral border (58) of the teeth (55) in release position, said annular band (46) comprising extended appendages (48) developing between one recess and the other up to the free end of the sleeve (42), said lateral border (58) being adapted to slide along the annular band (46) and the extended appendages (48), maintaining the teeth (55) in the release position, for decoupling the filtering cartridge (50) from the support body (42), said annular band (46) and the lateral border (58) further defining the cam means.

6. Unit (10) according to claim 5, wherein at least the annular band (46) has radial cambers (49) aligned—in plan view—with the extended appendages so as to further bend the teeth (55) in the radial direction when they are aligned—in plan view—with the extended appendages (48) with respect to when they are aligned—in plan view—with the recesses (43).

7. Unit (10) according to claim 1, wherein the filtering cartridge (50) comprises a toroidal filtering septum (53) and at least one support plate (51) fixed to an end of the filtering septum (53), wherein the coupling element comprises at least two teeth (55) obtained using an elastically yieldable material which are derived from the support plate (51), each of which defines a coupling surface (56) facing towards the support plate and which is inclined with respect to the direction of longitudinal development of the tooth by an angle comprised between 0° and 90°, wherein each of the teeth (55) comprises: a surface (57) opposite with respect to the coupling surface (56), defining the top part of the tooth (55) and being inclined with respect to the coupling surface (56) by an acute angle, and a sharp-pointed lateral border (58), wherein the opposite surface (57) extends in plan view beyond the coupling surface (56), in the direction opposite to the sharp-pointed lateral border (58), by a positive non-zero distance.

8. Unit (10) according to claim 7, wherein the opposite surface (57) of the tooth (55) is inclined by an acute angle with respect to the support plate (51).

9. Unit (10) according to claim 7, wherein the side of each tooth (55) from which the support surface (56) is derived cantilevered is aligned—in plan view—with a portion of said opposite surface (57).

10. Unit (10) according to claim 7, wherein the opposite surface (57) and the lateral border (58) define cam means adapted to bend the tooth (55) in the radial direction following a thrust thereof in the axial direction against a stop surface (45,451,452) provided in said casing (20).

11. Unit (10) according to claim 7, wherein each tooth (55) is adapted to be snap-coupled in at least one recess (43) provided in the support body (42) derived inside the casing (20), said recess (43) comprising a substantially flat abutment surface (44), adapted to define a surface for supporting the coupling surfaces (56) of the tooth (55), and a surface (45), opposite to the abutment surface (44), wherein each tooth (55) has a height, between the coupling surface (56) and the base of the tooth, greater with respect to the distance between the opposite surface (45) of the support body (42) and the free end thereof.

12. Unit according to claim 10, wherein the distance between the coupling surface (56) of the tooth (55) and the top part thereof is smaller than the distance between the opposite surface (45) of the support body (42) and the base thereof.

13. Unit (10) according to claim 7, wherein the support plate (51) axially closes the end of the filtering septum (53).

* * * * *